US012674485B2

(12) United States Patent
 Gurvich et al.

(10) Patent No.: US 12,674,485 B2
(45) Date of Patent: Jul. 7, 2026

(54) COMPOSITE DRIVE SHAFTS

(71) Applicant: Goodrich Corporation, Charlotte, NC (US)

(72) Inventors: Mark R. Gurvich, Middletown, CT (US); Michael J. King, Sauquoit, NY (US); Brayton Reed, New York Mills, NY (US); Joyel M. Schaefer, Earlville, NY (US)

(73) Assignee: Goodrich Corporation, Charlotte, NC (US)

( * ) Notice: Subject to any disclaimer, the term of this patent is extended or adjusted under 35 U.S.C. 154(b) by 327 days.

(21) Appl. No.: 18/238,451

(22) Filed: Aug. 25, 2023

(65) Prior Publication Data

US 2025/0067301 A1     Feb. 27, 2025

(51) Int. Cl.
 F16C 3/02        (2006.01)
(52) U.S. Cl.
 CPC .......... F16C 3/026 (2013.01); *F16C 2208/02* (2013.01); *F16C 2240/30* (2013.01)
(58) Field of Classification Search
 CPC ... F16C 3/026; F16C 2208/02; F16C 2240/30
 USPC ........................................ 464/181
 See application file for complete search history.

(56) References Cited

U.S. PATENT DOCUMENTS 4,248,062 A * 2/1981 McLain .................. B29C 70/86
                                                 464/181
4,325,174 A * 4/1982 Smith ....................... F16C 1/04
                                                 464/181

5,236,018 A     8/1993 Kobayashi et al.
12,179,913 B2 * 12/2024 Gurvich ................. F16C 3/026
2020/0063788 A1 * 2/2020 Gurvich ................. B64D 35/00
2023/0099452 A1     3/2023 Gurvich et al.
2023/0111679 A1     4/2023 Gurvich et al.
2023/0119039 A1     4/2023 Gurvich et al.

FOREIGN PATENT DOCUMENTS

DE         2909393 A1     3/1981
JP         S63199915 A    8/1988
JP         06540085 B2    7/2019
WO         2016080178 A1  5/2016

OTHER PUBLICATIONS

Extended European Search Report for EP Application No. 24195351.2, dated Feb. 3, 2025, 11 pages,.

* cited by examiner

*Primary Examiner* — Greg Binda
(74) *Attorney, Agent, or Firm* — Kinney & Lange, P.A.

(57)            ABSTRACT

A composite shaft comprises a plurality of composite elements arranged about an axis to form a hollow cylindrical shaft extending along the axis between a first end of the shaft and a second end of the shaft. The plurality of composite elements incudes: a first group of the composite elements aligned parallel to the axis, a second group of the composite elements arranged about the axis offset by an angle α relative to the first group in a first direction, a third group of the composite elements arranged about the axis offset by an angle γ relative to the first group in a second direction opposite the first direction, wherein the third group is offset from the second group by an angle 2α, and a fourth group of the composite elements arranged about the axis offset by an angle θ.

20 Claims, 6 Drawing Sheets

118a, b, c
120a, b, c

Z

118a′, b′, c′

118a, b, c

Z 118a, b, c

Z

COMPOSITE DRIVE SHAFTS

TECHNICAL FIELD

The present disclosure relates to drive shafts, and more particularly to composite drive shafts.

BACKGROUND

Conventionally, drive shafts are usually fully metallic. However, other materials, such as weight efficient fiber-reinforced polymer-matrix composites, can provide significant advantages over the conventional metallic drive shafts. Meanwhile, switching materials from metallic to composite, for example, requires many considerations regarding how the composite is formed to ensure the non-metallic drive shaft can withstand the same structural requirements applied to it as well as the conventional metallic shafts.

For example, among key structural requirements, drive shafts have to provide two seemingly conflicting structural responses, namely, to be stiff and strong under torque, but also to be flexible under axial and bending deformations. Such flexibility is needed to compensate for inevitable lateral and axial movements of shafts during service and/or to take into account potential imperfections of shaft installations, for example.

The conventional techniques have been considered satisfactory for their intended purpose. However, there is an ever present need for improved systems and methods for composite drive shafts and making the same. This disclosure provides a solution of design and method of making for this need.

SUMMARY

In accordance with at least one aspect of this disclosure, a composite shaft comprises a plurality of composite elements arranged about an axis to form a hollow cylindrical shaft extending along the axis between a first end of the shaft and a second end of the shaft. The plurality of composite elements incudes: a first group of the composite elements aligned parallel to the axis; a second group of the composite elements arranged about the axis offset by an angle $\alpha$ relative to the first group in a first direction; a third group of the composite elements arranged about the axis offset by an angle $\gamma$ relative to the first group in a second direction opposite the first direction, wherein the third group is offset from the second group by an angle $2\alpha$, and a fourth group of the composite elements arranged about the axis offset by an angle $\theta$.

The first, second, third, and fourth groups of composite elements form a web with one another to form the hollow cylindrical shaft, and the first, second, third, and fourth groups of composite elements are configured to cooperate together to allow the hollow cylindrical shaft to have enhanced buckling resistance, enhanced vibration resistance, and enhanced tortional strength when under rotational load.

The first end and the second end of the hollow cylindrical shaft can each include a respective enlarged portion extending radially outward from the hollow cylindrical shaft relative to the axis, The respective enlarged portion of the first end and of the second end can be larger radially relative to the axis than a connecting section connecting the respective enlarged portion of the first end to the respective enlarged portion of the second end. The respective enlarged portions of the first end and of the second end can each be configured to receive a respective coupling.

In certain embodiments, the first group of composite elements can include a plurality of plies arranged along the axis and circumferentially spaced apart from one another about the axis. A radial thickness of the plurality of plies can be uniformly distributed about the axis in a circumferential direction such that the plurality of plies covers an entirety of a circumference of the hollow cylindrical shaft.

In certain embodiments, the first group of composite elements can include a first plurality of plies arranged along the axis and circumferentially spaced apart from one another about the axis. A radial thickness of the first plurality of plies can be uniformly distributed about the axis in a circumferential direction such that the first plurality of plies covers an entirety of a circumference of the hollow cylindrical shaft. The first group of composite elements can also include a second plurality of plies arranged along the axis and circumferentially spaced apart from one another about the axis. A radial thickness of the second plurality of plies can be distributed about the axis at periodic, discrete intervals such that the second plurality of plies covers less than an entirety of the circumference of the hollow cylindrical shaft. A radial thickness of the second plurality of plies plus the radial thickness of the first plurality of plies is greater than the radial thickness of the first plurality of plies alone.

In certain embodiments, the first group of composite elements can include a plurality of plies arranged along the axis and circumferentially spaced apart from one another about the axis at periodic, discrete intervals about the axis such that the plurality of plies covers less than an entirety of a circumference of the hollow cylindrical shaft.

In certain embodiments, the fourth group of composite elements can include a plurality of plies arranged about the axis and axially spaced apart from one another along the axis. A radial thickness of the plurality of plies can be uniformly distributed along the axis in an axial direction such that the plurality of plies covers an entirety of an axial length of the hollow cylindrical shaft.

In certain embodiments, the fourth group of composite elements can include a first plurality of plies arranged about the axis and axially spaced apart from one another. A radial thickness of the first plurality of plies can be uniformly distributed along the axis in an axial direction such that first plurality of plies covers an entirety of an axial of the hollow cylindrical shaft. The fourth group of composite elements can include a second plurality of plies distributed along the axis and axially spaced apart from one another, wherein a radial thickness of the second plurality of plies is distributed along the axis at periodic, discrete intervals such that the second plurality of plies covers less than an entirety of the axial length of the hollow cylindrical shaft. A radial thickness of the second plurality of plies plus the radial thickness of the first plurality of plies is greater than the thickness of the first plurality of plies alone.

In certain embodiments, the fourth group of composite elements can include a plurality of plies arranged about the axis and axially spaced apart from one another at periodic, discrete intervals along the axis such that the plurality of plies covers less than an entirety of an axial length of the hollow cylindrical shaft.

In certain embodiments, the second and/or third group of composite elements can include a plurality of plies arranged about the axis and circumferentially spaced apart from one another, and a radial thickness of the plurality of plies can be uniformly distributed along the axis in a circumferential and an axial direction such that the plurality of plies covers an entirety of a circumference of the hollow cylindrical shaft and an axial length of the hollow cylindrical shaft.

In certain embodiments, the second and/or third group of composite elements can include a first plurality of plies arranged about the axis and circumferentially spaced apart from one another, and a radial thickness of the first plurality of plies can be uniformly distributed along the axis in a circumferential direction and an axial direction such that the first plurality of plies covers an entirety of a circumference of the hollow cylindrical shaft and an axial length of the hollow cylindrical shaft. The second and/or third group of composite elements can include a second plurality of plies distributed about the axis and circumferentially spaced apart from one another, and a radial thickness of the second plurality of plies is distributed about the axis at periodic, discrete intervals such that the second plurality of plies covers less than an entirety of the circumference of the hollow cylindrical shaft and less than an entirety of the axial length of the hollow shaft. Here, a radial thickness of the second plurality of plies plus the radial thickness of the first plurality of plies can be greater than the thickness of the first plurality of plies alone.

In certain embodiments, the second and/or third group of composite elements can include a plurality of plies arranged about the axis and circumferentially spaced apart from one another at periodic, discrete intervals about the axis such that the plurality of plies covers less than an entirety of a circumference of the hollow cylindrical shaft and less than an entirety of an axial length of the hollow cylindrical shaft.

In certain embodiments, the second group of composite elements and the third group of composite elements can each include a plurality of plies arranged about the axis along the respective offset and circumferentially spaced apart from one another. A radial thickness of the plurality of plies for each of the second group of composite elements and the third group of composite elements can be uniformly distributed about the axis and along the axis such that the plurality of plies of each of the first second group of composite elements and the third group of composite elements covers an entirety of a circumference of the hollow cylindrical shaft along the axial length of the hollow cylindrical shaft.

In certain embodiments, each of the first group of composite elements, the second group of composite elements, the third group of composite elements, and the fourth group of composite elements can each include a plurality of plies to form individual respective radial thicknesses. A total radial thickness of the hollow cylindrical shaft: the radial thickness of the first group is between 10-50% of the total thickness of the hollow cylindrical shaft; a radial thickness of the second group is between 10-40% of the total thickness of the hollow cylindrical shaft; a radial thickness of the third group is between 10-40% of the total thickness of the hollow cylindrical shaft; a radial thickness of the fourth group is between 5-30% of the total thickness of the hollow cylindrical shaft, where the radial thicknesses of the first through fourth groups add up to 100% of the total thickness of the hollow cylindrical shaft.

In certain embodiments, each of the first group of composite elements, the second group of composite elements, the third group of composite elements, and the fourth group of composite elements can each include a plurality of plies. The plurality of plies of at least one of the first group of composite elements, the second group of composite elements, the third group of composite elements, and/or the fourth group of composite elements can extend onto each of the enlarged portions of the first and second axial ends of the hollow cylindrical shaft.

In certain embodiments, the composite shaft can include a fifth group of composite elements, arranged along the hollow cylindrical shaft and spaced apart from one another about the axis. The fifth group of composite elements includes a plurality of plies, wherein the plurality of plies of the fifth group of composite elements are interleaved with the plurality of plies from at least one of the first group of composite elements, the second group of composite elements, the third group of composite elements, and/or the fourth group of composite elements.

In embodiments, the plurality of plies of the fifth group of composite elements can be shorter in axial length than the plurality of plies from at least one of the first group of composite elements, the second group of composite elements, the third group of composite elements, and/or the fourth group of composite elements such that the plurality of plies of the fifth group of composite elements do not extend on the central portion of the hollow cylindrical shaft.

In embodiments, each of the enlarged portions can include a first portion of constant radial thickness and a second portion having a tapered radial thickness, wherein the tapered radial thickness tapers in an axial direction as a function of an axial length of each ply of the fifth group of composite elements.

In certain embodiments, the plurality of plies of the fifth group of composite elements can be arranged: aligned parallel to the axis, about the axis offset by an angle $\beta$ relative to the axis, about the axis offset by an angle $-\beta$ relative to the axis, and/or about the axis offset by the angle $\theta$.

In certain embodiments, the angle $\alpha$ can be about 45 degrees, the angle $-\alpha$ can be about $-45$ degrees, the angle $\beta$ can be about 15 to 75 degrees, the angle $-\beta$ can be about $-15$ to $-75$ degrees, and the angle $\theta$ about 90 degrees.

In certain embodiments, the first group of composite elements, the second group of composite elements, the third group of composite elements, and the fourth group of composite elements can be layered atop one another to form discrete layers for each respective group of composite elements.

In certain embodiments, the first group of composite elements, the second group of composite elements, the third group of composite elements, and the fourth group of composite elements can be interleaved with one another to form varying, non-discrete layers for each respective group of composite elements.

In certain embodiments, the composite shaft can be formed by automated fiber placement (AFP) method of manufacturing. In accordance with at least one aspect of this disclosure, a method can include, forming a composite shaft using automated fiber placement, the method including, laying a first group of composite elements along and parallel to a shaft axis, laying a second group of composite elements about the shaft axis offset by a first angle relative to the shaft axis, laying a third group of composite elements about the shaft axis offset by a second angle relative to the shaft axis, and laying a fourth group of composite elements about the shaft axis offset by a third angle relative to the shaft axis. The first, second, and third offset angles can be different from one another. The layers of composite elements can be laid in any suitable order, e.g., to form discrete layers, or to form non-discrete layers, interleaving the groups of composite elements with one another during fiber placement.

In accordance with at least one aspect of this disclosure, a composite shaft can include a plurality of uni-directionally fiber-reinforced polymer-matrix plies arranged about an axis to form a hollow cylindrical shaft with circular cross-section extending along the axis between a first end of the shaft and a second end of the shaft. The plurality of plies can include, a first group of plies aligned parallel to the axis (e.g., 0 degrees relative to the axis, or between 0 and ±15 degrees relative to the axis), a second group of plies arranged about the axis offset by an angle α relative to the first group in a first direction (e.g., about 45 degrees relative to the axis), a third group of plies arranged about the axis offset by an angle –α relative to the first group in a second direction (e.g., about –45 degrees relative to the axis), and a fourth group of plies arranged about the axis offset by an angle θ (e.g., about 90 degrees relative to the axis, i.e., in the circumferential direction, or between about ±88 and 90 degrees relative to the axis, or between about ±75 and 90 degrees). The first, second, third, and fourth groups of plies can form a web with one another to form the hollow cylindrical shaft with circular cross-section.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein:

FIG. 10 is a schematic, axial cross-sectional partial view of an embodiment of a composite drive shaft, showing an arrangement of a plurality of plies of the composite drive shaft of the enlarged portion at an axial end of the composite shaft.

DETAILED DESCRIPTION

Figure 1:
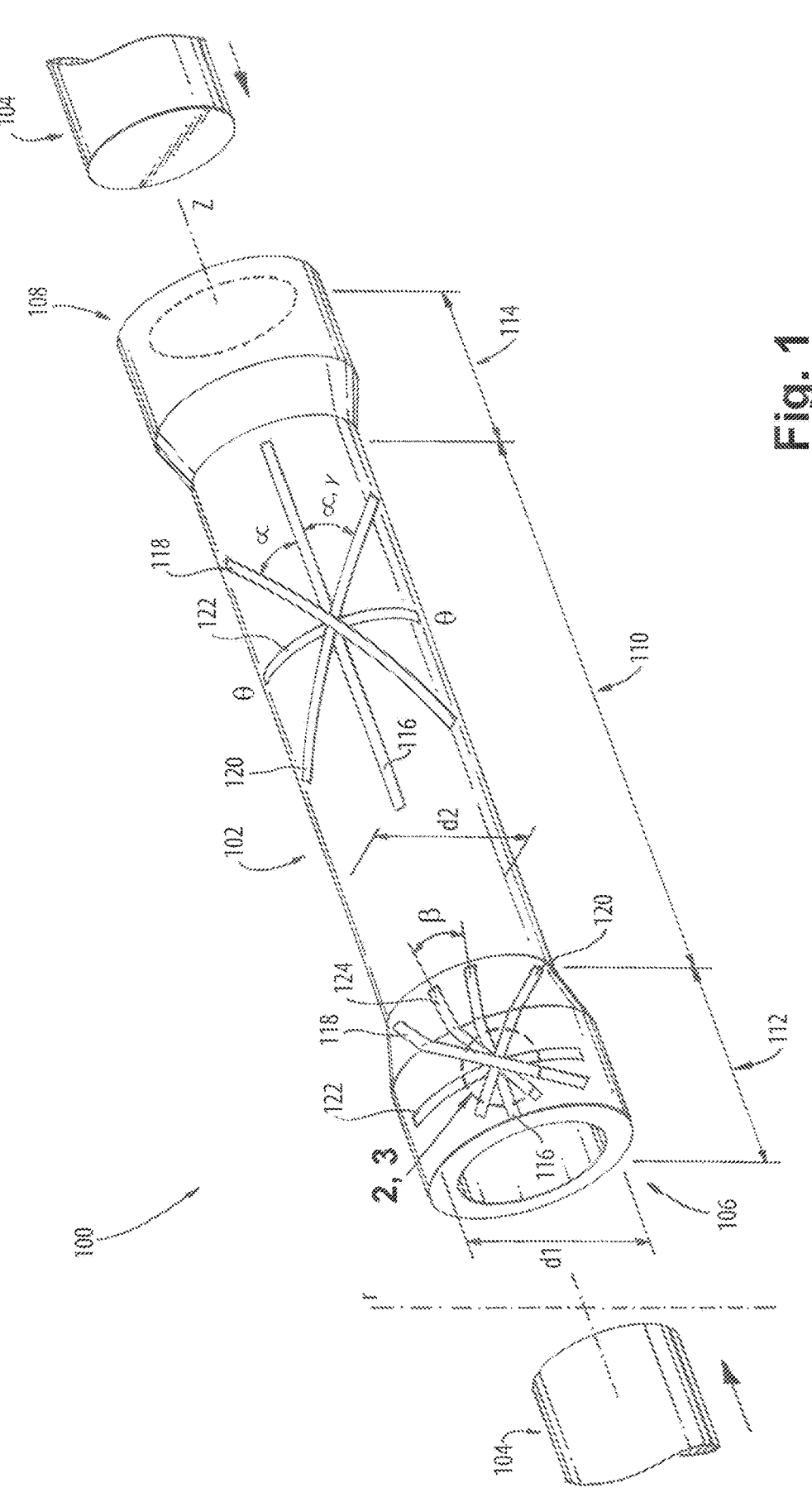
FIG. 1 is a perspective view of a system in accordance with this disclosure, showing an embodiment of a composite shaft.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-9.

Referring to FIG. 1, in accordance with at least one aspect of this disclosure, a system 100 includes a composite shaft 102 and one or more respective couplings 104 configured to connect to the composite shaft 102. The composite shaft 102 can be a drive shaft, for example, and the one or more couplings 104 can be metallic components of the drive system 100. In certain embodiments, the shaft 102 can be a hollow cylindrical shaft formed plurality of plies of uni-directionally fiber-reinforced polymer-matrix. The reinforcing fibers can include carbon, glass or organic (e.g., Kevlar) fibers or any combination of them. The polymer matrix can include thermoplastics or thermosets.

The composite shaft 102 can extending along a shaft axis Z between a first end 106 of the shaft 102 and a second end 108 of the shaft 102. The shaft 102 can include a connecting portion 110 and the first end 106 and the second end 108 of the shaft 102 can each include a respective enlarged portion 112, 114 extending radially outward from the shaft 102 relative to the axis. The connecting portion 110 can be axially between the enlarged portions 112, 114. As shown, the enlarged portions 112, 114 have a larger diameter d1 than the connecting portion 110, d2 so that the enlarged portions 112, 114 are configured to receive the respective coupling 104.

In embodiments, the shaft 102 can include a plurality of composite elements arranged about the axis Z to form the hollow cylindrical shaft 102. The plurality of composite elements can include a first group 116, a second group 118, a third group 120 and a fourth group 122. As shown, the first group of the composite elements 116 can be aligned parallel to the axis Z. The second group of the composite elements 118 can be arranged about the axis Z offset by an angle α relative to the first group 116. The third group of the composite elements 120 can be arranged about the axis Z offset by an angle γ relative to the first group 116 in a second direction opposite the first direction, the third group 120 offset from the second group 118 by an angle 2α, and the fourth group of the composite elements 122 can be arranged about the axis Z offset by an angle θ. In certain embodiments, the angle α can be about 45 degrees, the angle γ can be about −45 degrees, and the angle θ about 90 degrees, as shown.

The first 116, second 118, third 120, and fourth 122 groups of composite elements can together form a web with one another to form the hollow cylindrical shaft 102 such that the first 116, second 118, third 120, and fourth 122 groups of composite elements are configured to cooperate together to allow the hollow cylindrical shaft 102 to have enhanced vibration resistance (e.g., via the first group 116), enhanced tortional strength when under rotational load (e.g., via the second 118 and third 120 groups), and enhanced buckling resistance (e.g., via the fourth group 120).

Still with reference to FIG. 1, in embodiments, any one or more of, or all of, first 116, second 118, third 120, and fourth 122 groups of composite elements can extend along the connecting portion 110 and onto the first and second enlarged portions 112, 114. In certain embodiments, the composite shaft can include a fifth group of composite elements 124, arranged in one or more of the following orientations relative to the axis: aligned parallel to the axis Z, about the axis offset by an angle β relative to the axis Z, about the axis Z offset by an angle −β relative to the axis Z, and/or about the axis Z offset by the angle θ relative to the axis Z. In certain embodiments, the angle β can be within about 15 to 75 degrees. FIG. 1 shows the fifth group 124 offset by the angle β, where the angle β is between the 0 and α.

Figures 2, 3:
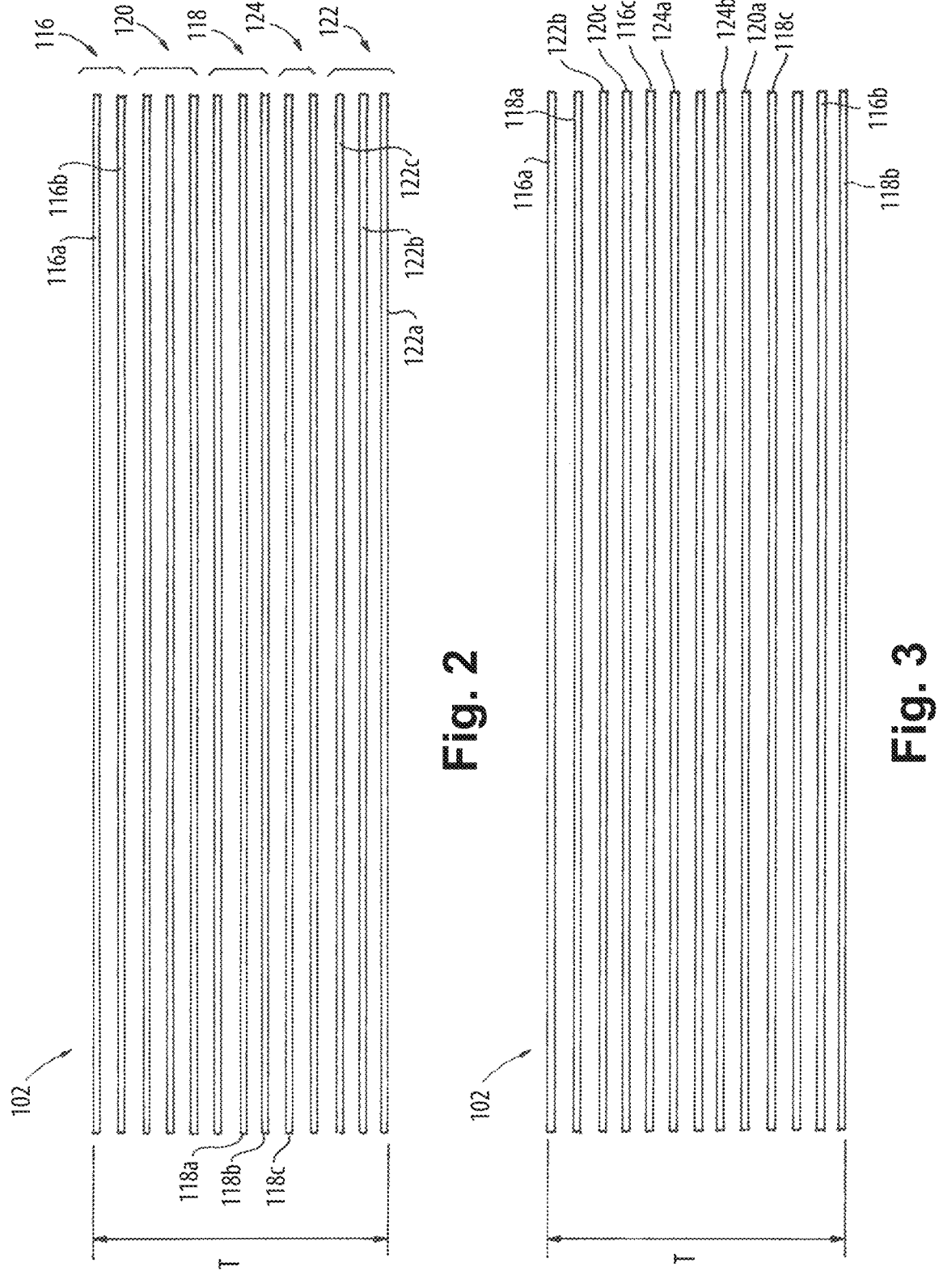
FIG. 2 is a schematic, axial cross-sectional partial view of an embodiment of a composite drive shaft wall, showing an arrangement of a plurality of plies of the composite drive shaft, wherein individual groups of plies are stacked atop one another.
FIG. 3 is a schematic, axial cross-sectional partial view of another embodiment of a composite drive shaft wall, showing an arrangement of a plurality of plies of the composite drive shaft, wherein individual plies are interleaved with one another.

With reference now to FIGS. 2 and 3, in embodiments, each of the first group of composite elements 116, the second group of composite elements 118, the third group of composite elements 120, the fourth group of composite elements 122, and the fifth group of composite elements 124 can each include a plurality of plies a, b, c, . . . , n, arranged along or about the axis as described herein. While plies described herein are referred to as plies a, b, c, . . . , n this should not be taken as an indication as the total number of plies. The number of plies could be any suitable number of plied between 1 and n to achieve a desired thickness for each respective group of composite elements.

In embodiments, as shown in FIG. 2 as an example of layup of plies, the first group of composite elements 116, the second group of composite elements 118, the third group of composite elements 120, the fourth group of composite elements 122 and the fifth group of composite elements 124 can be layered atop one another to form discrete layers for each respective group of composite elements, in any suitable stacking order. In other embodiments, such as shown in FIG.

3 as an example of layup of plies, the plies a, b, c, . . . , n of the groups of composite elements can be interleaved with one another, forming non-discrete layers of the respective groups.

Figures 4A, 4B, 4C, 5:
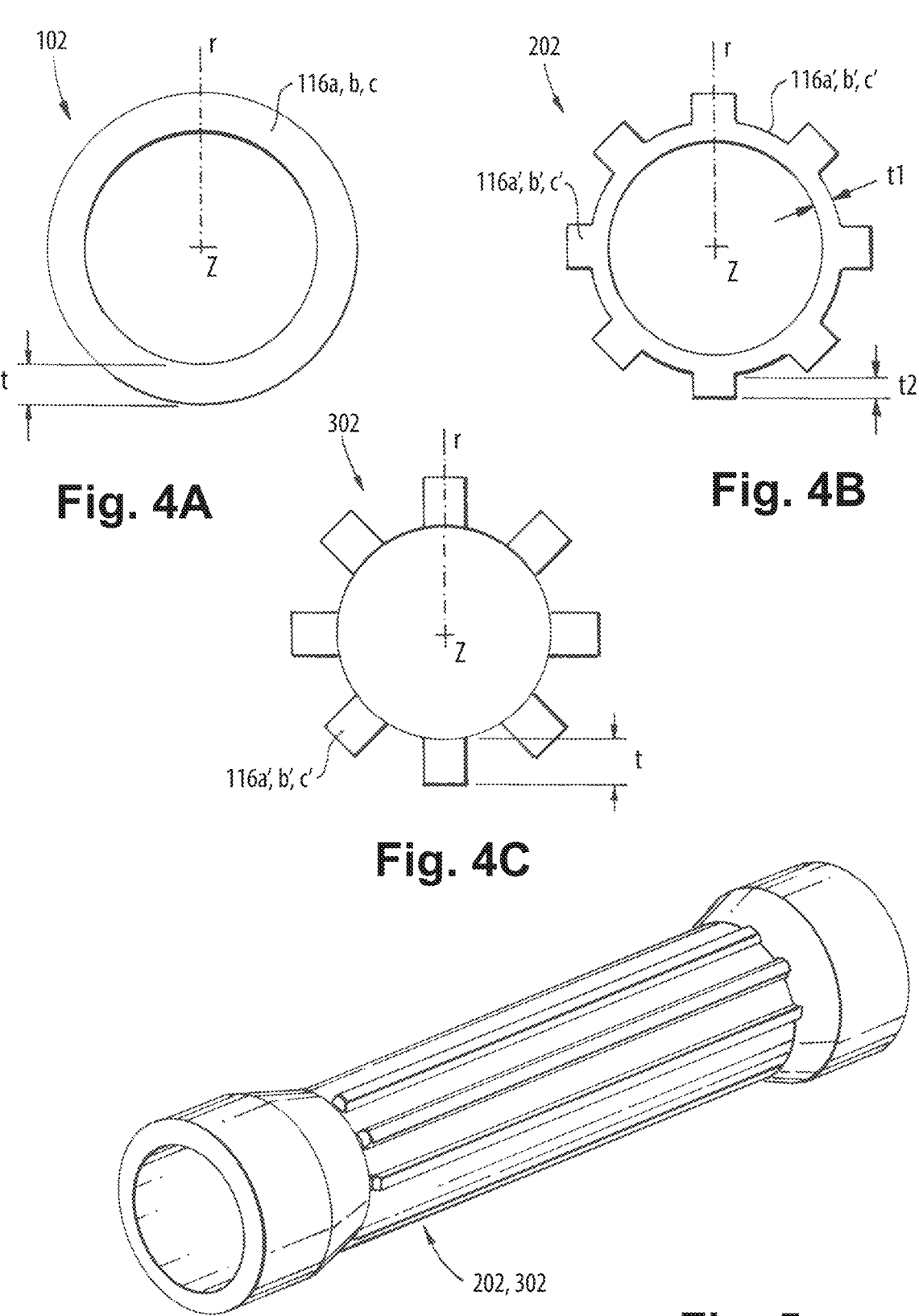
FIG. 4A is a schematic, diametric cross-sectional view of an embodiment of a composite drive shaft, showing an arrangement of a plurality of plies of the composite drive shaft wherein the plies of a first group have a uniform thickness in the circumferential direction.
FIG. 4B is a schematic, diametric cross-sectional view of an embodiment of a composite drive shaft, showing an arrangement of a plurality of plies of the composite drive shaft wherein the plies of a first group have a variable thickness in the circumferential direction.
FIG. 4C is a schematic, diametric cross-sectional view of an embodiment of a composite drive shaft, showing an arrangement of a plurality of plies of the composite drive shaft wherein the plies of a first group have a variable thickness in the circumferential direction.
FIG. 5 is a perspective view of the composite shaft with plurality of plies of FIG. 4B or 4C.

Referring now to FIGS. 4A-4C and FIG. 5, in certain embodiments, as shown in FIG. 4A, the plies 116a, b, c, . . . , n of the first group of composite elements 116 can be arranged along the axis Z and circumferentially spaced apart from one another about the axis Z. The plies can be aligned next to one another, abutting, so that radial thickness t of the plurality of plies is uniformly distributed about the axis Z in the circumferential direction. In such embodiments, the plurality of plies covers an entirety of a circumference of the hollow cylindrical shaft 102.

In certain embodiments, as shown in FIG. 4B, the first group of composite elements 116 can include a first plurality of plies 116a, b, c, arranged similar to FIG. 4A. The first group of composite elements 116 can also include a second plurality of plies 116a', b', c', . . . , n', arranged along the axis Z and circumferentially spaced apart from one another about the axis Z, but a radial thickness t2 of the second plurality of plies can be distributed about the axis at periodic, discrete intervals such that the second plurality of plies 116a', b', c', . . . , n' covers less than an entirety of the circumference of the hollow cylindrical shaft 202. The second plurality of plies 116a', b', c', . . . , n' can be disposed on top of the first plurality 116a, b, c, beneath the first plurality 116a, b, c, . . . , n or interleaved with the first plurality 116a, b, c, . . . , n. Here, as shown, the radial thickness t2 of the second plurality of plies plus the radial thickness t1 of the first plurality of plies is greater than the radial thickness t1 of the first plurality of plies alone. This results in a ridged texture in the shaft 202 shown in the perspective view of FIG. 5.

In certain embodiments, as shown in FIG. 4C, the plies 116a, b, c, . . . , n of the first group of composite elements 116 can be arranged along the axis Z and circumferentially spaced apart from one another about the axis Z at periodic, discrete intervals such that the plurality of plies covers less than an entirety of a circumference of the hollow cylindrical shaft 302. This results in a ridged shaft 202 similar to FIG. 4B, and shown in FIG. 5, however the shaft 302 will be left with portions where there are no plies of the first group of composite elements (e.g., between the ridges). These "empty portions" will can be filled, to any desirable extent, with plies from a different group of composite elements. The respective radial thicknesses shown in FIGS. 4B and 4C are shown in an exaggerated manner for clarity, however, in practice, the ridges on the shaft 202, 302 may be on the order of millimeters beyond the outer diameter of the shaft 202, 302.

Figure 6A:
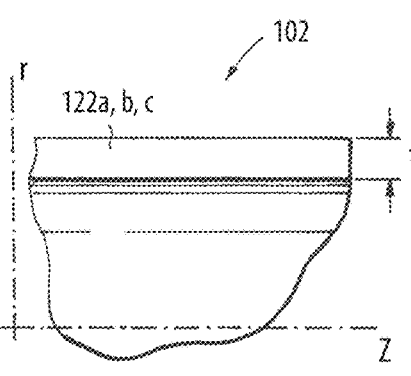
FIG. 6A is a schematic, axial cross-sectional partial view of an embodiment of a composite drive shaft wall, showing an arrangement of a plurality of plies of the composite drive shaft wherein the plies of a first group have a uniform thickness in the axial direction.
Figure 6B:
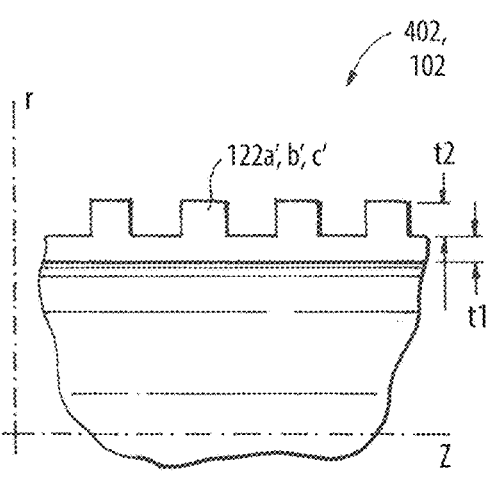
FIG. 6B is a schematic, axial cross-sectional partial view of an embodiment of a composite drive shaft wall, showing an arrangement of a plurality of plies of the composite drive shaft wherein the plies of a first group have a variable thickness in the axial direction.
Figure 6C:
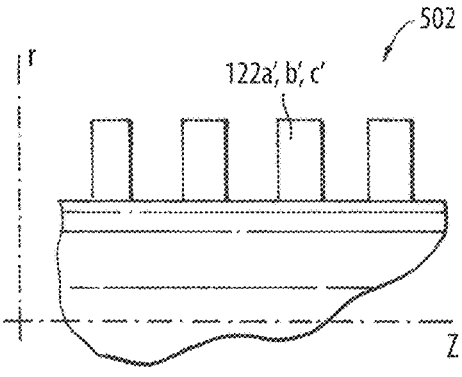
FIG. 6C is a schematic, axial cross-sectional partial view of an embodiment of a composite drive shaft, showing an arrangement of a plurality of plies of the composite drive shaft wherein the plies of a first group have a variable thickness in the axial direction.
Figure 7:
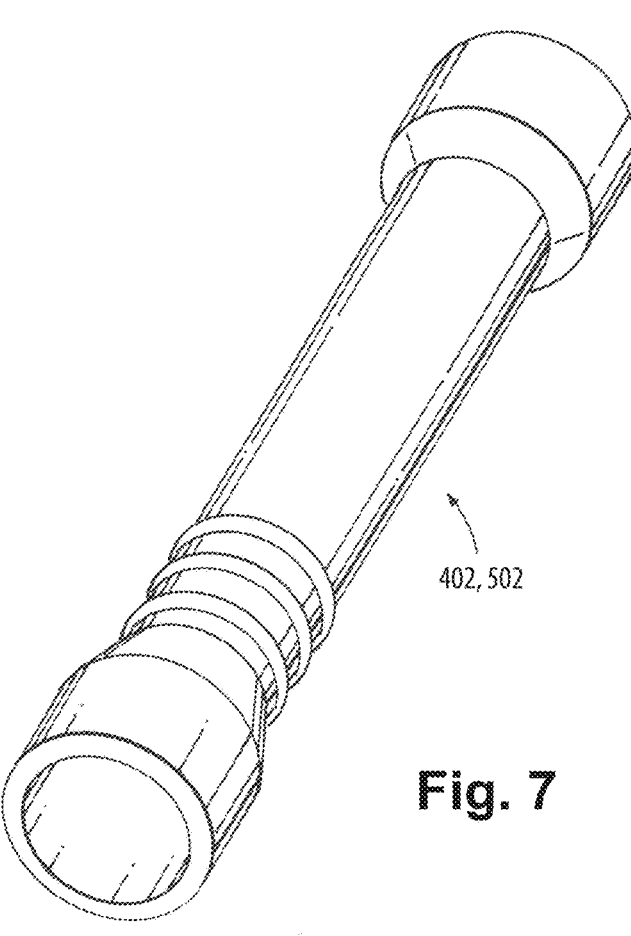
FIG. 7 is a perspective view of the composite shaft with plurality of plies of FIG. 6B or 6C.

Referring now to FIGS. 6A-6C and FIG. 7, in certain embodiments, such as shown in FIG. 6A, the plies of the fourth group of composite elements 122a, b, c can be arranged in a similar manner to those of the first group 116 and shown in FIGS. 4A-4C, except that for the fourth group in FIGS. 6A-6C, the plies 120a, b, c, . . . , n vary in the radial thickness t in the axial direction along the shaft 102. For example, as shown in FIG. 6A, the radial thickness t of the plies 122a, b, c, . . . , n can be uniformly distributed along the axis Z in an axial direction such that the plurality of plies 122a, b, c, . . . , n covers an entirety of an axial length of the hollow cylindrical shaft 102.

In certain embodiments, as shown in FIG. 6B, the second plurality of plies 122a', b', c', . . . , n' of the fourth group can be distributed along the axis Z and axially spaced apart from one another so that the radial thickness t2 of the second plurality of plies 122a', b', c' . . . , n' is distributed along the axis Z at periodic, discrete intervals such that the second plurality of plies covers less than an entirety of the axial length of the hollow cylindrical shaft 402. This results in an hooped texture in the shaft 402 as shown in the perspective view of FIG. 7, where the second plurality of plies 122*a', b', c', . . . , n'* form hoops along the axial length of the shaft 402 at the discrete intervals.

In certain embodiments, such as shown in FIG. 6C, the plurality of plies 122*a, b, c* can be arranged about the axis Z and axially spaced apart from one another at periodic, discrete intervals along the axis such that the plurality of plies 122*a, b, c* covers less than an entirety of an axial length of the hollow cylindrical shaft 502. This results in a hooped shaft similar to FIG. 6B and shown in FIG. 7, however the shaft 502 will be left with portions where there are no plies of the fourth group of composite elements (e.g., between the hoops). These "empty portions" will can be filled, to any desirable extent, with plies from a different group of composite elements. The respective radial thicknesses shown in FIGS. 6B and 6C are shown in an exaggerated manner for clarity, however, in practice, the ridges on the shaft 402, 502 may be on the order of millimeters beyond the outer diameter of the shaft 402, 502.

In embodiments, (e.g., in addition to any one or more embodiments described herein) the plies of the second group of composite elements 118*a, b, c, . . . , n* and/or the plies of third group of composite elements 120*a, b, c,* can be arranged about the axis Z along the respective offset and circumferentially spaced apart from one another but abutting such that a radial thickness of the plies for each of the second group of composite elements 118 and/or the third group of composite elements 120, are uniformly distributed about the axis and along the axis such that the plurality of plies of each of the second group of composite elements 118*a, b, c* and/or the third group of composite elements 120*a, b, c* covers an entirety of a circumference of the hollow cylindrical shaft along the axial length of the hollow cylindrical shaft. This is shown in FIG. 8A, similar to what is shown schematically in FIGS. 4A and 6A, for example.

Figures 8A, 8B, 8C:
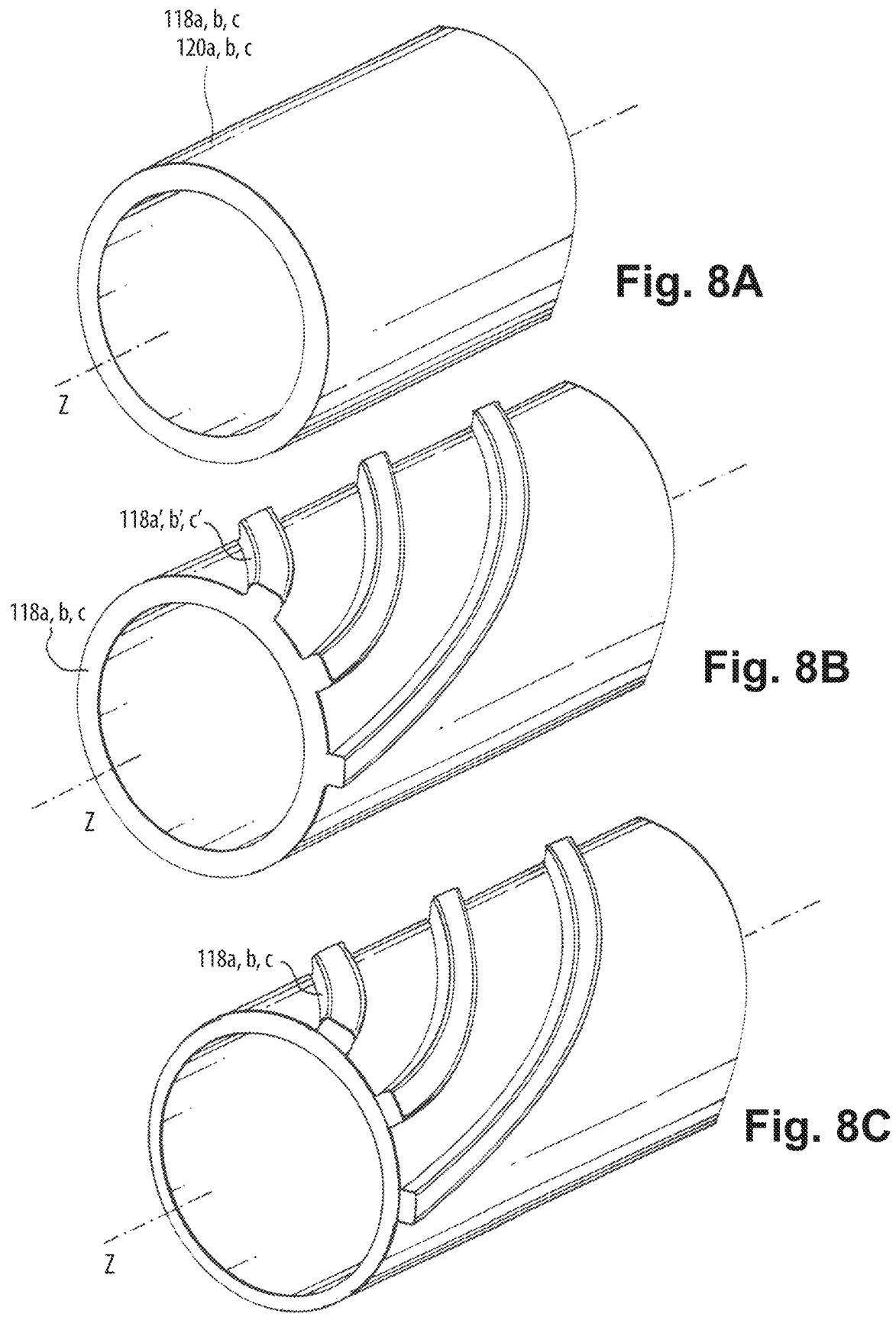
FIG. 8A is a schematic, perspective partial view of an embodiment of a composite drive shaft, showing an arrangement of a plurality of plies of the composite drive shaft wherein the plies of a second and/or third group have a uniform thickness.
FIG. 8B is a schematic, perspective partial view of an embodiment of a composite drive shaft, showing an arrangement of a plurality of plies of the composite drive shaft wherein the plies of a second and/or third group have a variable thickness in the circumferential direction, shown on an example of the second group.
FIG. 8C is a schematic, perspective partial view of an embodiment of a composite drive shaft, showing an arrangement of a plurality of plies of the composite drive shaft wherein the plies of a second and/or third group have a variable thickness in the circumferential direction, shown on an example of the second group.

In certain embodiments, the second group of composite elements 118 and/or the third group of composite elements can include a first set of plies 118*a, b,c* and a second set of plies 118*a',b', c', . . . , n'*, where the first set of plies 118*a, b, c* is arranged uniformly about the axis and the second set of plies 118*a', b', c' . . . , n'* is arranged about the axis at discrete intervals, such as shown in FIG. 8B, similar to that described with respect to FIGS. 4B and 6B. In certain embodiments, the plurality of plies 118*a, b, c* can be arranged at discrete intervals about the axis, with no uniform thickness, such as shown in FIG. 8C, and similar to that described with respect to FIGS. 4C and 6C. While FIGS. 8B and 8C are shown with respect to the second group of composite elements 118, the third group of composite elements 120 could be arranged in a similar manner, in embodiments, although not shown here.

With reference now to FIGS. 2-8C, in certain embodiments, the plies of each of the first group of composite elements, the second group of composite elements, the third group of composite elements, and the fourth group of composite elements can have respective radial thicknesses for each group (e.g., all plies of the respective group added together whether arranged in discrete layers or interleaved throughout the radial thickness of the shaft 102). A total radial thickness T of the hollow cylindrical shaft can be broken down as follows: the radial thickness of the first group can be between 10-50%, the radial thickness of the second group can be between 10-40%, the radial thickness of the third group can be between 10-40%, and the radial thickness of the fourth group can be between 5-30% of the total thickness of the hollow cylindrical shaft 102, where the radial thicknesses of the first through fourth groups add up to 100% of the total thickness T of the hollow cylindrical shaft 102. In embodiments that include the fifth group of composite elements, the respective radial thicknesses may change. Further, one having ordinary skill in the art in view of this disclosure would appreciate how to select the respective radial thicknesses for each group of composite elements, e.g., based on desired strength properties and/or application, without undue experimentation.

Figure 9:
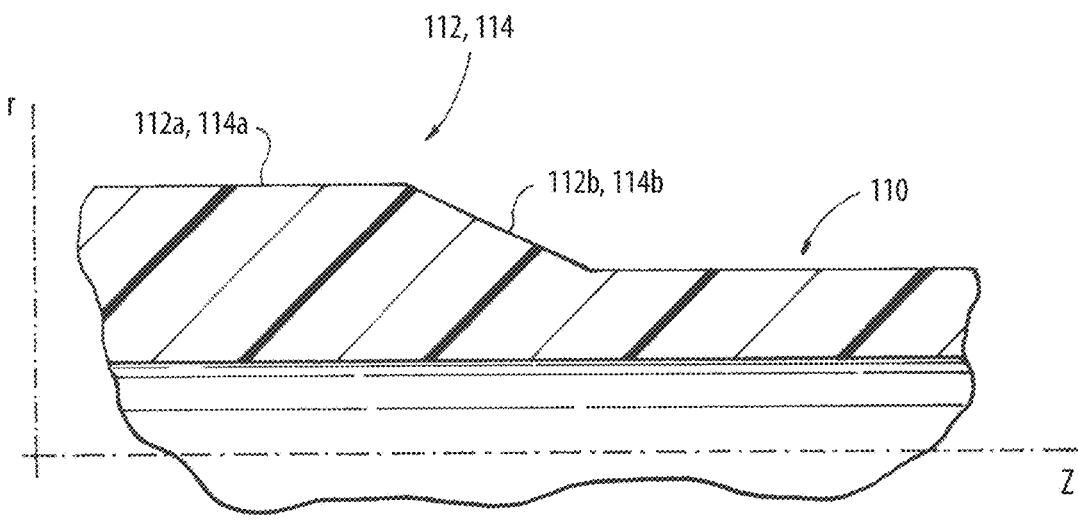
FIG. 9 is a schematic, enlarged, axial cross-sectional partial view of an embodiment of a composite shaft wall, showing an enlarged portion at an axial end of the composite shaft.
Figure 1:
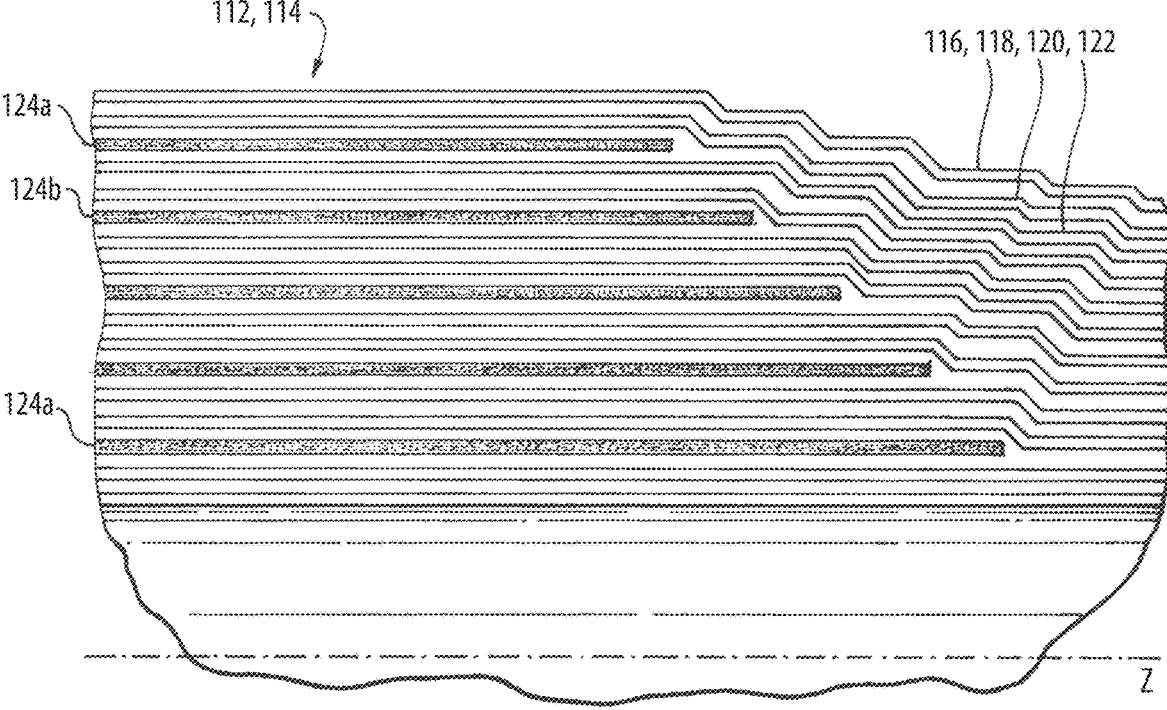

With reference now to FIGS. 9 and 10, in embodiments, the plurality of plies of the fifth group of composite elements 124*a, b, c,* can be shorter in axial length than the plurality of plies from at least one of the first, second, third, or fourth group of composite elements such that the plurality of plies of the fifth group of composite elements 124*a, b, c,* do not extend on the connecting portion 110 of the hollow cylindrical shaft 102. Having the plies of the fifth group 124*a, b, c,* be shorter in axial length causes the enlarged portions 112, 114 to have a first portion 112*a,* 114*a* of constant radial thickness and a second portion 112*b,* 114*b* having a tapered radial thickness. The tapered radial thickness tapers in an axial and radial direction as a function of an axial length of each ply of the fifth group of composite elements 124*a, b, c, . . . , n*. For example, as shown in FIG. 10, the plies closer to the outer diameter (124*a, b*) of the shaft 102 are shortest, the plies closer to the inner diameter (124*n*) of the shaft 102 are longest, while those in between get progressively shorter moving radially outward from the inner diameter. As the number of plies of the fifth group, and their respective axial lengths, change, the length and steepness of the tapered portion 112*b,* 114*b* changes.

In certain embodiments, the composite shaft 102 can be formed by automated fiber placement (AFP) method of manufacturing. In accordance with at least one aspect of this disclosure, a method can include, forming a composite shaft (e.g., any embodiment of shaft 102 described herein) using AFP, the method including, laying a first group of composite elements (e.g., group 116) along and parallel to a shaft axis, laying a second group of composite elements (e.g., group 118) about the shaft axis offset by a first angle relative to the shaft axis, laying a third group of composite elements (e.g. group 120) about the shaft axis offset by a second angle relative to the shaft axis, and laying a fourth group of composite elements (e.g., group 122) about the shaft axis offset by a third angle relative to the shaft axis. The first, second, and third offset angles can be different from one another. The layers of composite elements can be laid in any suitable order, e.g., to form discrete layers, or to form non-discrete layers, interleaving the groups of composite elements with one another during the fiber placement method.

Embodiments of a draft shaft disclosed herein include drive shafts made of advanced fiber-reinforced polymer-matrix composites. There are important advantages associated with replacement of conventional fully metallic drive systems by composite configurations, such as those described herein. The advantages of replacing metallic with composite drive shafts can include, among others, damage tolerance improvement, enhanced ballistic and post-ballistic behavior, weight reduction, cost/labor reduction, resilience to supply-chain variability, and opportunities for material-based optimization.

Embodiments of the shaft can include composite drive shafts for use in hybrid composite drive systems (e.g., a composite tube with end metallic diaphragms). Embodiments of the composite drive shaft, as compared to a conventional metallic shaft, can include, enhanced damage tolerance, improved structural performance (e.g., with respect to fatigue strength, buckling resistance, vibrational behavior) through optimized composite layup, and efficient repair opportunities in case of service damages.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

12

What is claimed is:

1. A composite shaft, comprising:

a plurality of composite elements arranged about an axis to form a hollow cylindrical shaft extending along the axis between a first end of the shaft and a second end of the shaft, wherein the plurality of composite elements incudes:

a first group of the composite elements aligned parallel to the axis;

a second group of the composite elements arranged about the axis offset by an angle $\alpha$ relative to the first group in a first direction;

a third group of the composite elements arranged about the axis offset by an angle $\gamma$ relative to the first group in a second direction opposite the first direction, wherein the third group is offset from the second group by an angle $2\alpha$; and a fourth group of the composite elements arranged about the axis offset by an angle $\theta$, wherein the first, second, third, and fourth groups of composite elements form a web with one another to form the hollow cylindrical shaft, wherein the first end and the second end each include a respective enlarged portion extending radially outward from the hollow cylindrical shaft, wherein the respective enlarged portion of the first end and of the second end are thicker than a connecting section connecting the respective enlarged portion of the first end to the respective enlarged portion of the second end, wherein the respective enlarged portions of the first end and of the second end are each configured to be connected with respective couplings; and wherein each of the first group of composite elements, the second group of composite elements, the third group of composite elements, and the fourth group of composite elements includes a plurality of plies, wherein the plurality of plies of at least one of the first group of composite elements, the second group of composite elements, the third group of composite elements, and/or the fourth group of composite elements extend onto each of the enlarged portions of the first and second axial ends of the hollow cylindrical shaft, and further comprising:

a fifth group of composite elements, arranged along the hollow cylindrical shaft and spaced apart from one another, wherein the fifth group of composite elements includes a plurality of plies, wherein the plurality of plies of the fifth group of composite elements is interleaved with the plurality of plies from at least one of the first group of composite elements, the second group of composite elements, the third group of composite elements, and/or the fourth group of composite elements, wherein the plurality of plies of the fifth group of composite elements are shorter in axial length than the plurality of plies from at least one of the first group of composite elements, the second group of composite elements, the third group of composite elements, and/or the fourth group of composite elements, and wherein each of the enlarged portions includes a first portion in the axial direction of constant radial thickness and a second portion in the axial direction having a tapered radial thickness, wherein the tapered radial thickness tapers in an axial direction as a function of an axial length of each ply of the fifth group of composite elements.

2. The composite shaft of claim 1, wherein the plurality of plies of the first group of composite elements is arranged along the axis and circumferentially spaced apart from one another, wherein a radial thickness of the plurality of plies of the first group of composite elements is uniformly distributed about the axis in a circumferential direction such that the plurality of plies covers an entirety of a circumference of the hollow cylindrical shaft.

3. The composite shaft of claim 1, wherein the plurality of plies of the first group of composite elements includes a first plurality of plies arranged along the axis and circumferentially spaced apart from one another, wherein a radial thickness of the first plurality of plies is uniformly distributed about the axis in a circumferential direction such that the first plurality of plies covers an entirety of a circumference of the hollow cylindrical shaft, and wherein the plurality of plies of the first group of composite elements includes a second plurality of plies arranged along the axis and circumferentially spaced apart from one another about the axis, wherein the second plurality of plies are distributed about the axis at periodic, discrete intervals such that the second plurality of plies covers less than an entirety of the circumference of the hollow cylindrical shaft, wherein a combined radial thickness of the second plurality of plies plus the radial thickness of the first plurality of plies is greater than the radial thickness of the first plurality of plies alone.

4. The composite shaft of claim 1, wherein the plurality of plies of the first group of composite elements includes is arranged along the axis and circumferentially spaced apart from one another about the axis at periodic, discrete intervals about the axis such that the plurality of plies of the first group of composite elements covers less than an entirety of a circumference of the hollow cylindrical shaft.

5. The composite shaft of claim 1, wherein the plurality of plies of the fourth group of composite elements is arranged about the axis and axially spaced apart from one another along the axis, wherein a radial thickness of the plurality of plies of the fourth group of composite elements is uniformly distributed along the axis in an axial direction such that the plurality of plies covers an entirety of an axial length of the hollow cylindrical shaft.

6. The composite shaft of claim 1, wherein the plurality of plies of the fourth group of composite elements includes a first plurality of plies arranged about the axis and axially spaced apart from one another, wherein a radial thickness of the first plurality of plies is uniformly distributed along the axis in an axial direction such that the first plurality of plies covers an entirety of an axial of the hollow cylindrical shaft, and wherein the plurality of plies of the fourth group of composite elements includes a second plurality of plies distributed along the axis and axially spaced apart from one another, wherein a radial thickness of the second plurality of plies is distributed along the axis at periodic, discrete intervals such that the second plurality of plies covers less than an entirety of the axial length of the hollow cylindrical shaft, wherein a radial thickness of the second plurality of plies plus the radial thickness of the first plurality of plies is greater than the thickness of the first plurality of plies alone.

7. The composite shaft of claim 1, wherein the plurality of plies of the fourth group of composite elements is arranged about the axis and axially spaced apart from one another at periodic, discrete intervals along the axis such that the plurality of plies of the fourth group of composite elements covers less than an entirety of an axial length of the hollow cylindrical shaft.

8. The composite shaft of claim 1, wherein the plurality of plies of each of the second group of composite elements and the third group of composite elements is arranged about the axis along the respective offsets and circumferentially spaced apart from one another, wherein a radial thickness of the plurality of plies for each of the second group of composite elements and the third group of composite elements is uniformly distributed about the axis and along the axis such that the plurality of plies of each of the second group of composite elements and the third group of composite elements covers an entirety of a circumference of the hollow cylindrical shaft along the axial length of the hollow cylindrical shaft.

9. The composite shaft of claim 1, wherein the plurality of plies of the second and/or third group of composite elements is arranged about the axis and circumferentially spaced apart from one another, wherein a radial thickness of the plurality of plies of the second and/or third group of composite elements is uniformly distributed along the axis in a circumferential and an axial direction such that the plurality of plies covers an entirety of a circumference of the hollow cylindrical shaft and an axial length of the hollow cylindrical shaft.

10. The composite shaft of claim 1, wherein the plurality of plies of the second and/or third group of composite elements includes a first plurality of plies arranged about the axis and circumferentially spaced apart from one another, wherein a radial thickness of the first plurality of plies is uniformly distributed along the axis in a circumferential direction and an axial direction such that the first plurality of plies covers an entirety of a circumference of the hollow cylindrical shaft and an axial length of the hollow cylindrical shaft, and wherein the plurality of plies of the second and/or third group of composite elements includes a second plurality of plies distributed about the axis and circumferentially spaced apart from one another, wherein a radial thickness of the second plurality of plies is distributed about the axis at periodic, discrete intervals such that the second plurality of plies covers less than an entirety of the circumference of the hollow cylindrical shaft and less than an entirety of the axial length of the hollow cylindrical shaft, wherein a radial thickness of the second plurality of plies plus the radial thickness of the first plurality of plies is greater than the thickness of the first plurality of plies alone.

11. The composite shaft of claim 1, wherein the plurality of plies of the second and/or third group of composite elements is arranged about the axis and circumferentially spaced apart from one another at periodic, discrete intervals about the axis such that the plurality of plies of the second and/or third group of composite elements covers less than an entirety of a circumference of the hollow cylindrical shaft and less than an entirety of an axial length of the hollow cylindrical shaft.

12. The composite shaft of claim 1, wherein the plurality of plies of each of the first group of composite elements, the second group of composite elements, the third group of composite elements, and the fourth group of composite elements form respective radial thicknesses in the connection section, wherein, of a total radial thickness of the hollow cylindrical shaft:

the radial thickness of the first group of composite elements is between 10-50% of the total thickness of the hollow cylindrical shaft;

a radial thickness of the second group of composite elements is between 10-40% of the total thickness of the hollow cylindrical shaft;

a radial thickness of the third group of composite elements is between 10-40% of the total thickness of the hollow cylindrical shaft; and a radial thickness of the fourth group of composite elements is between 5-30% of the total thickness of the hollow cylindrical shaft, wherein the radial thicknesses of the first through fourth groups of composite elements add up to 100% of the total thickness of the hollow cylindrical shaft in the connection section.

13. The composite shaft of claim 1, wherein the plurality of plies of the fifth group of composite elements are arranged: along the axis, about the axis offset by an angle β, about the axis offset by an angle –β, and/or about the axis offset by the angle θ.

14. The composite shaft of claim 13, wherein the angle α is about 45 degrees, the angle γ is about –45 degrees, the angle +β is about 15 to 75 degrees, the angle –β is about –15 to –75 degrees, and the angle θ is about 90 degrees.

15. The composite shaft of claim 1, wherein the angle α is about 45 degrees, the angle γ is about –45 degrees, and the angle θ is about 90 degrees.

16. The composite shaft of claim 1, wherein the first group of composite elements, the second group of composite elements, the third group of composite elements, and the fourth group of composite elements are layered atop one another to form discrete layers for each respective group of composite elements.

17. The composite shaft of claim 1, wherein the first group of composite elements, the second group of composite elements, the third group of composite elements, and the fourth group of composite elements are interleaved with one another to form varying, non-discrete layers for each respective group.

18. The composite shaft of claim 1, wherein the composite shaft is formed by automated fiber placement.

19. A composite shaft, comprising:

a plurality of composite elements arranged about an axis to form a hollow cylindrical shaft extending along the axis between a first end of the shaft and a second end of the shaft, wherein the plurality of composite elements incudes:

a first group of the composite elements aligned parallel to the axis;

a second group of the composite elements arranged about the axis offset by an angle α relative to the first group in a first direction;

a third group of the composite elements arranged about the axis offset by an angle γ relative to the first group in a second direction opposite the first direction, wherein the third group is offset from the second group by an angle 2α; and a fourth group of the composite elements arranged about the axis offset by an angle θ, wherein the first, second, third, and fourth groups of composite elements form a web with one another to form the hollow cylindrical shaft, wherein the first end and the second end each include a respective enlarged portion extending radially outward from the hollow cylindrical shaft, wherein the respective enlarged portion of the first end and of the second end are thicker than a connecting section connecting the respective enlarged portion of the first end to the respective enlarged portion of the second end, wherein the respective enlarged portions of the first end and of the second end are each configured to be connected with respective couplings; and wherein each of the first group of composite elements, the second group of composite elements, the third group of composite elements, and the fourth group of composite elements each includes a plurality of plies to form respective radial thicknesses in the connection section, wherein, of a total radial thickness of the hollow cylindrical shaft:

the radial thickness of the first group is between 10-50% of the total thickness of the hollow cylindrical shaft;

a radial thickness of the second group is between 10-40% of the total thickness of the hollow cylindrical shaft;

a radial thickness of the third group is between 10-40% of the total thickness of the hollow cylindrical shaft; and a radial thickness of the fourth group is between 5-30% of the total thickness of the hollow cylindrical shaft, wherein the radial thicknesses of the first through fourth groups add up to 100% of the total thickness of the hollow cylindrical shaft in the connection section.

20. The composite shaft of claim 19, wherein each of the first group of composite elements, the second group of composite elements, the third group of composite elements, and the fourth group of composite elements each includes a plurality of plies, wherein the plurality of plies of at least one of the first group of composite elements, the second group of composite elements, the third group of composite elements, and/or the fourth group of composite elements extend onto each of the enlarged portions of the first and second axial ends of the hollow cylindrical shaft, and further comprising:

a fifth group of composite elements, arranged along the hollow cylindrical shaft and spaced apart from one another, wherein the fifth group of composite elements includes a plurality of plies, wherein this plurality is interleaved with the plurality of plies from at least one of the first group of composite elements, the second group of composite elements, the third group of composite elements, and/or the fourth group of composite elements, wherein the plurality of plies of the fifth group of composite elements are shorter in axial length than the plurality of plies from at least one of the first group of composite elements, the second group of composite elements, the third group of composite elements, and/or the fourth group of composite elements, wherein each of the enlarged portions includes a first portion in the axial direction of constant radial thickness and a second portion in the axial direction having a tapered radial thickness, wherein the tapered radial thickness tapers in an axial direction as a function of an axial length of each ply of the fifth group of composite elements.

* * * * *